United States Patent [19]

Takano et al.

[11] Patent Number: 5,060,919
[45] Date of Patent: Oct. 29, 1991

[54] DAMPING COEFFICIENT CONTROL DEVICE FOR VIBRATION DAMPER

[75] Inventors: Kazuya Takano, Kamakura; Takeshi Noguchi, Yokohama, both of Japan

[73] Assignee: Bridgestone Corporation, Tokyo, Japan

[21] Appl. No.: 542,657

[22] Filed: Jun. 25, 1990

Related U.S. Application Data

[63] Continuation of Ser. No. 180,833, Apr. 13, 1988, abandoned.

[30] Foreign Application Priority Data

Apr. 17, 1987 [JP] Japan .................. 62-94942

[51] Int. Cl.$^5$ ........................ F16F 9/53; F16F 13/00
[52] U.S. Cl. .................. 267/140.1; 180/312; 248/562; 248/636; 280/707
[58] Field of Search ............. 267/140.1 R, 140.1 E, 267/140.1 AE, 219; 188/267; 248/562, 636; 280/707; 180/300, 312, 902

[56] References Cited

U.S. PATENT DOCUMENTS

| | | |
|---|---|---|
| 3,124,368 | 3/1964 | Corley et al. .................. 280/707 X |
| 4,215,842 | 8/1980 | Brenner et al. .................. 248/562 |
| 4,491,207 | 1/1985 | Boonchanta et al. . |
| 4,685,698 | 8/1987 | Klinkner et al. .................. 280/707 |
| 4,720,087 | 1/1988 | Duclos et al. .................. 188/267 X |
| 4,742,998 | 5/1988 | Schubert .................. 267/140.1 X |
| 4,757,981 | 7/1988 | Hartel .................. 180/312 |
| 4,759,534 | 7/1988 | Hartel .................. 267/140.1 |

FOREIGN PATENT DOCUMENTS

| | | |
|---|---|---|
| 115417 | 8/1984 | European Pat. Off. ......... 267/140.1 |
| 3426014 | 2/1985 | Fed. Rep. of Germany . |
| 3712656 | 11/1987 | Fed. Rep. of Germany ...... 180/300 |
| 60-104828 | 6/1985 | Japan . |
| 61-74930 | 4/1986 | Japan . |
| 62-20929 | 1/1987 | Japan . |
| 62-31738 | 2/1987 | Japan . |
| 147139 | 7/1987 | Japan .................. 248/562 |

Primary Examiner—George E. A. Halvosa
Attorney, Agent, or Firm—Oliff & Berridge

[57] ABSTRACT

A damping coefficient control device, for use in a vibration damper of the type which is disposed between a vibration source and a vibration receiving section to be isolated from the vibration of the vibration source and which has a plurality of small liquid chambers charged with an electrorheologic fluid and communicated through an orifice, includes electrodes disposed in the orifice to receive a voltage which is suitably controlled so as to cause a change in the viscosity of the electrorheologic fluid, thereby controlling the damping coefficient provided by the fluid. The damping coefficient control device has sensors for sensing the velocities of the vibration source and the vibration receiving section. When the direction of the velocity of the vibration receiving section is the same as the direction of the relative velocity of the vibration receiving section relative to the vibration source, the voltage applied to the electrodes is controlled such as to increase the damping coefficient provided by the electrorheologic fluid, whereas, when these directions are different, the voltage is controlled such as to decrease the damping coefficient. This arrangement enables the vibrations of different frequencies to be damped without any risk that resonance will occur.

14 Claims, 11 Drawing Sheets

DAMPING COEFFICIENT CONTROL DEVICE FOR VIBRATION DAMPER

This is a continuation of application Ser. No. 07/180,883 filed April 13, 1988, now abandoned.

BACKGROUND OF THE INVENTION

1. Field of the Invention

The present invention relates to a damping coefficient control device for vibration dampers and, more particularly, to a damping coefficient control device for a vibration damper of the type disposed between a vibration generating section (vibration source) and a vibration receiving section and capable of damping vibration by viscous resistance of an electrorheologic fluid charged therein.

2. Description of the Related Art

Such a vibration damper has been known as having a liquid chamber a portion of which is constituted by an elastic material, as used in automobiles for mounting an engine, a carburetor and a body of a vehicle. This liquid chamber is sectioned into two small liquid sub-chambers by means of a partition wall. The liquid sub-chambers are communicated with each other by an orifice.

When the vibration damper is subjected to vibrations, the internal liquid contained in one of the liquid sub-chambers is moved to the other through the orifice, and the energy of the vibrations is absorbed by virtue of the resistance to passage through the orifice of the liquid.

In such a vibration damper, in order to cope with the vibrations of different frequencies which are generated in such a vibration source as an automotive engine, a plurality of orifices having different cross-sectional areas must be provided in such a manner that they are opened and closed independently of each other by such an opening and closing means as valves, resulting in a complicated construction.

In order to overcome this problem, a vibration damper has been proposed which employs an electrorheologic fluid as the vibration damping fluid. In operation, the viscosity of the fluid is changed by application of an electric field so as to enable the vibration damper to operate in response to different frequency levels of vibration. This type of vibration damper is disclosed in Japanese Patent Laid-Open Nos 104828/1985 and 74930/1986.

This type of vibration damper, however, is still unsatisfactory in the following respects. The first problem is that the vibration damper tends to resonate at the resonance frequency so that the vibration of the resonance frequency is undesirably transmitted at a higher rate than that of the other frequency ranges. Another problem is that the vibration damping performance deteriorates in the vibration damping range due to attenuation.

SUMMARY OF THE INVENTION

Accordingly, an object of the present invention is to provide a damping coefficient control device for a vibration damper, which is capable of readily damping the vibrations of different frequencies without allowing the resonance to occur.

To this end, according to the present invention, there is provided a damping coefficient control device in a vibration damper which is placed between a vibration source and a vibration receiving section which is to be isolated from the vibration of the vibration source, the vibration damper having a liquid chamber having a portion made of an elastically deformable material and charged with an electrorheologic fluid, a partition wall which divides the liquid chamber into a plurality of sub-chambers, an orifice providing a communication between the sub-chambers, and electrodes disposed in said orifice, the damping coefficient control device being constituted to control the voltage applied to the electrodes to vary the viscosity of the electrorheologic fluid thereby controlling the damping coefficient of the vibration damper, the damping coefficient control device comprising: first velocity detecting means for detecting a first velocity which is the velocity of the vibration receiving section; second velocity detecting means for detecting a second velocity which is the velocity of the vibration source; discrimination means for discriminating whether the direction of the first velocity is the same as the direction of the relative velocity of the vibration receiving section relative to the vibration source; and control means for controlling the voltage such that the damping coefficient of the fluid is increased when the direction of the first velocity is the same as the relative velocity and that the damping coefficient of the fluid is decreased when the direction of the first velocity is different from that of the relative velocity.

Thus, the damping coefficient control device of the invention is used in a vibration damper which is disposed between a vibration source B and a vibration receiving section A which is to be insulated from vibration and which has a liquid chamber a part of which is made of an elastic material, the liquid chamber being sectioned into a plurality of liquid sub-chambers which are communicated through orifices. This vibration damper can be approximately regarded as being a vibration system which is, as shown in FIG. 3(1), constituted by a parallel connection of a dash pot having a vibration damping coefficient c and a spring having a spring constant k. The vibration occurring in the vibration source is represented by $y = y_0 \sin \omega t$, where, y represents displacement, $y_0$ represents amplitude, $\omega$ represents angular velocity and t represents time. On the other hand, the vibration of the vibration receiving section A, which has a mass m, is represented by $x = x_0 \sin(\omega t + \delta)$, where x represents displacement, $x_0$ represents amplitude and $\delta$ represents initial phase. The dynamic behavior of the vibration receiving section A is then given by the following formula (1):

$$m \ddot{x} + c(\dot{x} - \dot{y}) + k x = k y_0 \sin \omega t \tag{1}$$

where, $\ddot{x}$ represents the quadratic differential of the displacement x by the time t, i.e., acceleration, while $\dot{x}$ and $\dot{y}$ represent, respectively, differentials of the displacements x and y by the time t, i.e., velocities.

The transmission characteristics expressed by the formula (1) is illustrated in FIG. 3(2) from which it will be understood that the vibration transmission factor cannot be reduced to a level below 1, even though the damping coefficient c is increased. In FIG. 3(2), $f_0$ represents characteristic frequency peculiar to the system.

FIG. 4(1) shows a vibration system having a series connection of a spring having a spring constant k and a dash pot having a damping coefficient c′. In this case, the dynamic behavior of the vibration receiving section A is expressed by the following formula (2):

$$m \ddot{x} + c \dot{x} + k x = k y_0 \sin \omega t \tag{2}$$

The transmission characteristic of this vibration system is as illustrated in FIG. 4(2). In this case, the vibration transmission factor can be reduced to a level below 1 by setting the damping coefficient c' at a higher level than a predetermined value $c_0$. A condition expressed by the following formula (3) is derived by transforming the formula (1):

$$m\ddot{x} + c \cdot \frac{\dot{x} - \dot{y}}{\dot{x}} \cdot \dot{x} + kx = ky_0 \sin \omega t \quad (3)$$

where, the velocity $\dot{x}$ is not equal to zero.

The term $c(\dot{x} - \dot{y})/\dot{x}$ corresponds to c' in the formula (2). Therefore, if the term $c(\dot{x} - \dot{y})/\dot{x}$ can be determined to be greater than the predetermined value $c_0$ as expressed by the following formula (4), it is possible to realize a non-resonant state as illustrated in FIG. 4(2):

$$c \cdot \frac{\dot{x} - \dot{y}}{\dot{x}} > c_0 \quad (4)$$

On condition of $(x-y)/x > 0$, the vibration damping coefficient c is expressed by the following formula (5):

$$c > \frac{\dot{x}}{\dot{x} - \dot{y}} c_0 \quad (5)$$

where the velocities $\dot{x}$ and $\dot{y}$ are not equal to each other.

Therefore, when the direction of the velocity $\dot{x}$ and the direction of the relative velocity $\dot{x} - \dot{y}$ are the same, it is possible to obtain a condition approximating non-resonance state, by determining the damping coefficient c at a level which is large enough to meet the condition of the formula (5).

The term $(\dot{x} - \dot{y})/\dot{x}$ may take a negative value, i.e., the condition $(\dot{x} - \dot{y})/\dot{x} < 0$ is met, depending on the directions and absolute values of the velocities $\dot{x}$ and $\dot{y}$. In such a case, a condition $c < 0$ is derived from the formula (4). As a matter of fact, the damping coefficient c cannot become negative. Therefore, when the condition $(\dot{x} - \dot{y})/\dot{x} < 0$ is met, i.e., when the direction of the velocity x is not the same as the direction of the relative velocity $(\dot{x} - \dot{y})$, it is necessary to make the damping coefficient c extremely small, thereby minimizing the damping effect.

In order to comply with these demands, according to the invention, a vibration damper which is placed between a vibration source and a vibration receiving section has a liquid chamber a portion of which is constituted by an elastic material and which is charged with an electrorheologic fluid, the chamber being sectioned into a plurality of sub-chambers which are communicated through orifices, the orifices being provided therein with electrodes. The vibration damper further has a velocity detection means capable of detecting velocities of the vibration source and the vibration receiving section, and means for discriminating the velocity of the vibration receiving section and the direction of the relative velocity of the vibration receiving section relative to the velocity of the vibration source. If the direction of the velocity of the vibration receiving section is the same as the direction of the relative velocity, the voltages applied to the electrodes are controlled to change the viscosity of the electrorheologic fluid such as to increase the damping coefficient, whereas, when the direction of the velocity of the vibration receiving section is different from the direction of the relative velocity, the voltages applied to the electrodes are controlled as to decrease the damping coefficient.

By controlling the viscosity of the electrorheologic fluid in the manner described, it is possible to realize a state of the vibration system which is substantially free from resonance.

The electrohelogic fluid, which may also be referred to as "electroviscous fluid", may be a fluid which significantly changes its viscosity when placed in electric fields of different intensities, as disclosed in, for example, U.S. Pat. Nos. 2886151 and 3047507.

Thus, according to the invention, the damping coefficient of the vibration damper is changed by varying the viscosity of an electrorheologic fluid in orifices in accordance with the directions of velocities of the vibration source and the vibration receiving section. It is thus possible to obtain a means having a simple construction but yet capable of damping vibrations of different levels of frequency without suffering from resonance and degradation in the vibration damping effect.

The above and other objects, features and advantages of the present invention will become clear from the following description of the preferred embodiments when the same is read in conjunction with the accompanying drawings.

DESCRIPTION OF THE PREFERRED EMBODIMENTS

Preferred embodiments of the present invention will be described hereinunder with reference to the accompanying drawings.

Figure 1:
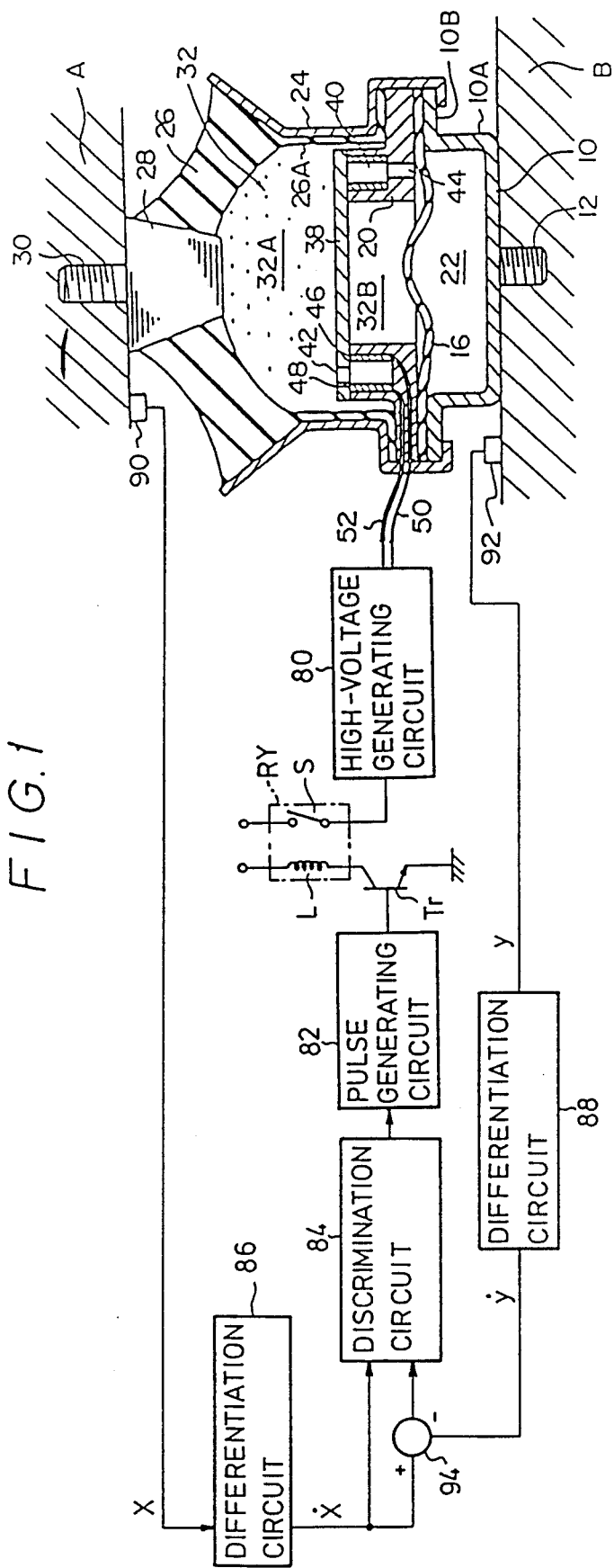
FIGS. 1 and 1A are block diagrams of a damping coefficient control device embodying the present invention.

As will be seen from FIG. 1, a vibration damper has a base plate 10 having a mounting bolt 12 projecting from a lower central portion thereof. The mounting bolt 12 is fixed to a vibration source B which may be, for instance, the body or the engine of an automobile.

The peripheral portion of the base plate 10 is turned substantially at a right angle so as to form a substantially tubular upright wall 10A the upper end of which is bent outward substantially at a right angle so as to form a flange 10B which carries a diaphragm 16 and a partition wall 20. A pneumatic chamber 22 is formed between the diaphragm 16 and the base plate 10. The pneumatic chamber 22 may be communicated with the exterior if necessary.

The periphery of the partition wall 20 and the diaphragm 16 are caulked by the lower end of an outer cylinder 24 onto the flange 10B so as to be fixed to the latter. The inside diameter of the outer cylinder 24 is progressively increased from an intermediate portion towards the upper end of the outer cylinder 24. A main vibration absorber 26 which is made of an elastic material such as a rubber is fixed at its outer peripheral surface to the inner peripheral surface of the outer cylinder 24 by, for example, vulcanization. The main vibration absorber 26 has a lower extension 26A which extends along the inner peripheral surface of the outer cylinder 24 and which is partially clamped between the outer cylinder 24 and the partition wall 20.

A support 28 is fixed at its peripheral surface to a central bore of the main vibration absorber 26 by vulcanization. A mounting bolt 30 projected from the center of the support 28 is fixed to a vibration receiving section A mounted on the support 28. The vibration receiving section A may be, for example, the engine or the body of the automobile.

The main vibration absorber 26 constitutes, together with the outer cylinder 24 and the diaphragm 16, a liquid chamber 32 which is charged with an electrorheologic fluid. The electrorheologic fluid may be, for example, a mixture which contains 40 to 60 wt % of silicic acid, 30 to 50 wt % of an organic phase having a low boiling temperature, 50 to 10 wt % of water, and 5 wt % of dispersion medium. Thus, the electrorheologic fluid may be a fluid which contains isododekan. The electrorheologic fluid, when not supplied with electric current, exhibits a viscosity of the level which is substantially the same as those of ordinary hydraulic fluids but changes its viscosity in accordance with the level of electric field applied thereto, such that the higher the electric field intensity, the greater the viscosity.

Figure 2:
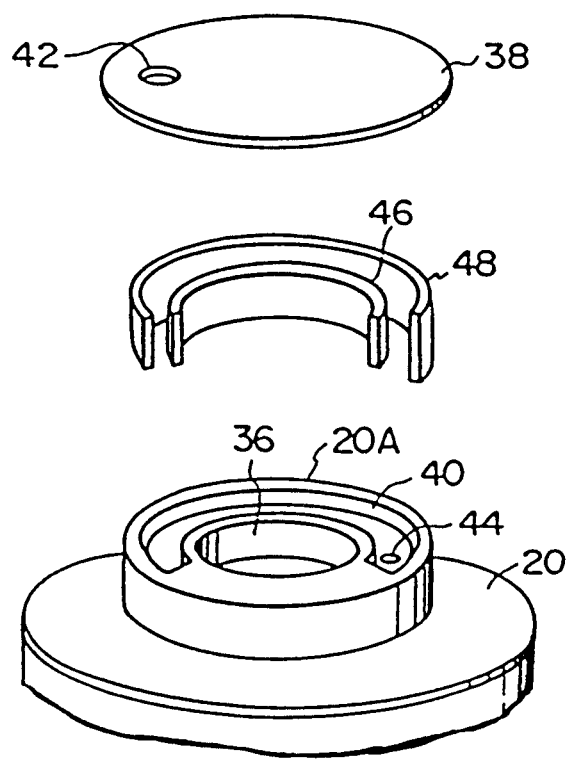
FIG. 2 is an exploded perspective view of a partition wall of a vibration damper.
Figure 3:
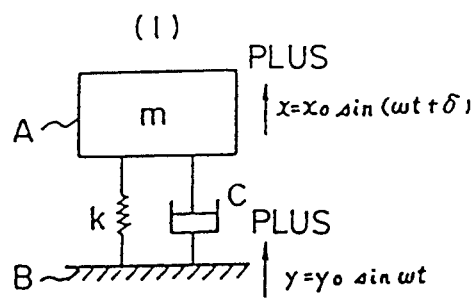
FIGS. 3(1), 3(2), 4(1) and 4(2) are diagrams for illustrating the principle of the damping coefficient control device of the present invention.
Figure 4:
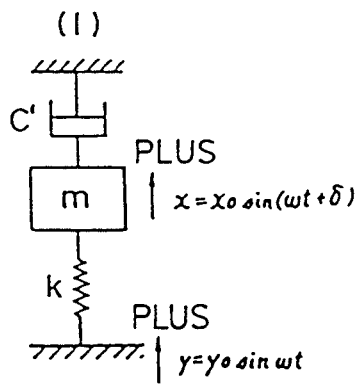
Figure 4:
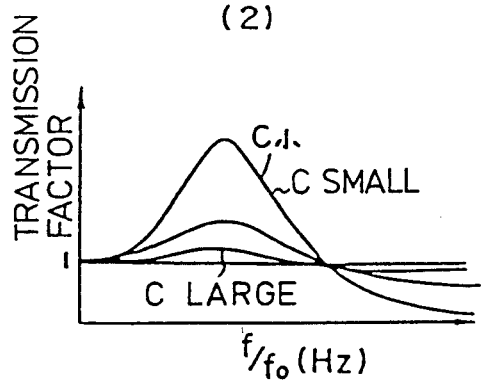
Figure 4:
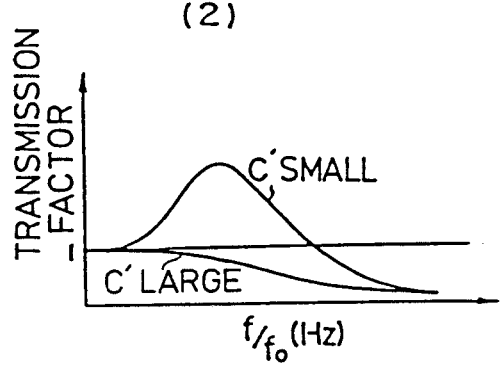

As will be seen from FIG. 2, a through hole 36 is formed in a protrusion 20A formed in the center of the partition wall 20. The through hole 36 is closed by a partition cover 38 which is fixed to the protrusion 20A by heat-bonding or high-frequency welding. Thus, the space in the liquid chamber 32 is divided by the partition wall 20 and the partition cover 38 into an upper sub-chamber 32A and a lower sub-chamber 32B.

The protrusion 20A has a groove which has a substantially C-shaped form when viewed in plan. The open part of the groove is covered by the partition cover 38 so that the groove provides an orifice 40. The orifice 40 communicates at its longitudinal ends with the upper and lower sub-chambers 32A and 32B through respective holes 42 and 44 which are formed, respectively, in the partition cover 38 and the partition wall 20.

Thus, the electrorheologic fluid in the upper and lower sub-chambers 32A and 32B can flow from one to the other of the sub-chambers 32A and 32B and vice versa through the orifice 40, while encountering viscous resistance across the orifice 40. A pair of electrode plates 46 and 48, which are concentric with each other, are placed on the opposing surfaces of the orifice 40. As will be understood from FIG. 1, these electrode plates 46 and 48 are connected to a high-voltage generating circuit 80 through lead lines 50, 52 which are embedded in the partition wall 20, so as to be supplied with an electric current as required.

The partition wall 20 embedding the lead lines 50 and 52, therefore, has to be made at least partially from an insulating material such as a plastic, ceramics and so forth. The distance between the electrode plates 46 and 48 is determined to be between about 1 and 2 mm, for example.

The vibration receiving section A has a displacement sensor 90 adapted for detecting the displacement x of the vibration receiving section A, while another displacement sensor 92 fixed to the vibration source B is adapted to sense the displacement of the vibration source B. The displacement sensor 90 is connected to a differentiation circuit 86, while the displacement sensor 92 is connected to a differentiation circuit 88. The differentiation circuit 86 has an output which is connected both to a discrimination circuit 84 and an adder 94. The output of the differentiation circuit 88 is connected to the adder 94. The output of the adder 94 is connected to the discrimination circuit 84.

The discrimination circuit 84 is connected through a pulse generator 82 to the base of a transistor Tr. The transistor Tr has an emitter which is grounded and a collector which is connected to a power supply through an exciting coil L of a relay RY. The relay RY has a contact which is connected at its one end to the power supply and at its other end to the high-voltage generating circuit 80. As explained before, the high-voltage generating circuit 80 is connected to the electrode plates 46 and 48 through the lead lines 50 and 52 as explained before.

In operation of the described embodiment, any vibration generated in the vibration source B is transmitted to the vibration receiving section A through the support 28 of the vibration damper, as well as to the main vibration absorber 26 so that the vibration is damped appreciably by the internal friction of the main vibration absorber 26. The displacement of the vibration source B caused by the vibration is detected by the displacement sensor 92 and is delivered to the differentiation circuit 88 which differentiates the output of the sensor 92 so as to compute the velocity y of the vibration source. The velocity y is input to the adder 94. On the other hand, the displacement of the vibration receiving section A, caused by the vibration transmitted thereto, is detected by the displacement sensor 90 the output of which is delivered to the differentiation circuit 86 which computes the velocity x of the vibration receiving section A. The thus computed velocity x is delivered both to the discrimination circuit 84 and the adder 94. The adder 94 computes the relative velocity $\dot{x} - \dot{y}$ of the vibration receiving section a relative to the vibration source B. The relative velocity $\dot{x} - \dot{y}$ is input to the discrimination circuit 84. The discrimination circuit 84 discriminates whether the product $\dot{x}(\dot{x} - \dot{y})$ of the velocity x of the vibration receiving section A and the relative velocity $\dot{x} - \dot{y}$ is positive or negative, thus judging whether the direction of the velocity of the vibration receiving section and the direction of the above-mentioned relative velocity is the same or not. The discrimination circuit 84 then delivers a pulse representing the result of the discrimination to a pulse generating circuit 82.

The pulse generating circuit 82 is adapted to produce a high-level signal when the direction of velocity of the vibration receiving section A is the same as that of the relative velocity, and a low-level signal when the direction of velocity of the vibration receiving section A is not the same as that of the relative velocity. When the signal of the high level is produced by the pulse generating circuit 82, the base of the transistor Tr is supplied with an electric current so that the transistor Tr is turned on, with the result that the exciting coil L is energized to close the contact S of the relay RY, whereby the high-voltage generating circuit 80 operates to apply a high voltage between the electrode plates 46 and 48 of the high-voltage generating circuit 80. In consequence, the viscosity of the electrorheologic fluid is increased so as to provide a greater damping coefficient. Conversely, when the level of the signal output from the pulse generating circuit 82 is low, the transistor Tr is kept off so that the relay contact S is kept open. In this state, no high voltage is supplied from the high-voltage generating circuit 80 to the electrode plates 46 and 48 so that the viscosity of the electrorheologic fluid is not increased and the vibration damping coefficient becomes smaller.

The vibration generated in the vibration source B and delivered to the main vibration absorber 26 through the support 28 is transmitted to the liquid chamber 32 through the main vibration absorber 26. In consequence, the electrorheologic fluid in the sub-chamber 32A is caused to be displaced into the sub-chamber 32B. When the direction of the velocity of the vibration receiving section A is the same as that of the relative velocity of the vibration receiving section relative to the vibration source, a high voltage is applied between the electrode plates 46 and 48 as explained before, so that the electrorheologic fluid exhibits a greater viscosity and, hence, a greater damping coefficient, whereby the vibration is effectively damped by the viscosity resistance encountered by the electrorheologic fluid flowing through the orifice.

Conversely, when the direction of the velocity of the vibration receiving section A is different from that of the relative velocity of the vibration receiving section A relative to the vibration source B, no voltage is applied to the electrode plates 46 and 48, so that the viscosity of the electrorheologic fluid is not increased. In consequence, the damping coefficient is maintained small so as to prevent the vibration receiving section from being vibrated by the vibration of the vibration source.

Figure 5:
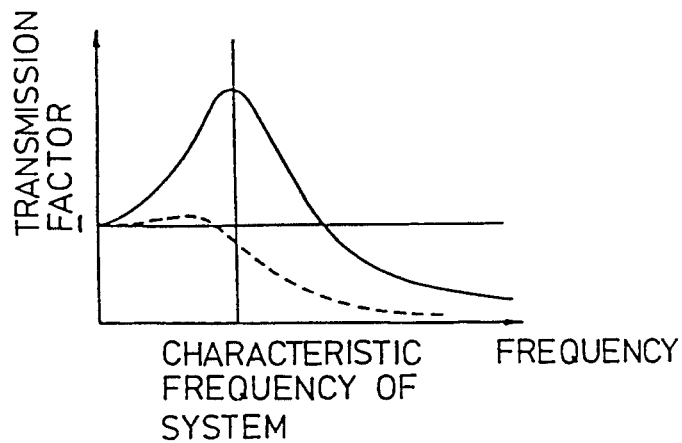
FIG. 5 is a diagram showing vibration damping characteristics exhibited by a vibration damper incorporating the described embodiment and that of a known vibration damper.

FIG. 5 shows the vibration damping characteristic as obtained under the described control of the damping coefficient c, in comparison with that of a known vibration damper. In FIG. 5, the characteristics as obtained when the damping coefficient is controlled and when the damping coefficient is not controlled are shown by a broken-line curve and a solid-line curve, respectively.

When the vibration source is an automotive engine while the vibration receiving section is a chassis of the automobile, the vibration has a wide distribution of frequency. In such a case, the direction of the velocity of the chassis caused by the vibration and the direction of the velocity of the chassis relative to the engine may be the same or different according to the frequency of vibration. The supply of the electric current to the electrode plates 46 and 48 is controlled in accordance with the relationship between the above-mentioned velocity and the relative velocity, whereby the damping coefficient is selectively changed to enable the damper to absorb vibration over a wide frequency band.

Since the orifice 40 has a substantial length, it is possible to damp the vibration of the engine even when the vibration has a wide distribution of frequencies of vibration components.

In a practical example of application of the invention, applied to an engine mount for mounting the engine on the chassis of an automobile, the engine may exhibit a bouncing vibration of a frequency on the order of 15 Hz and a rolling vibration of a frequency on the order of 7 Hz. In such a case, the vibration damper may be constituted such that the viscosity of the fluid is tuned to cope with the bouncing vibration of the engine without supplying the electric current to the electrode plates 46 and 48 and, when the rolling vibration occurs, the electric current is supplied to the electrode plates 46 and 48 in response to the rolling vibration so as to increase the viscosity of the fluid, thereby offsetting the position of the peak of the damping coefficient to a level near 7 Hz.

Figure 1A:
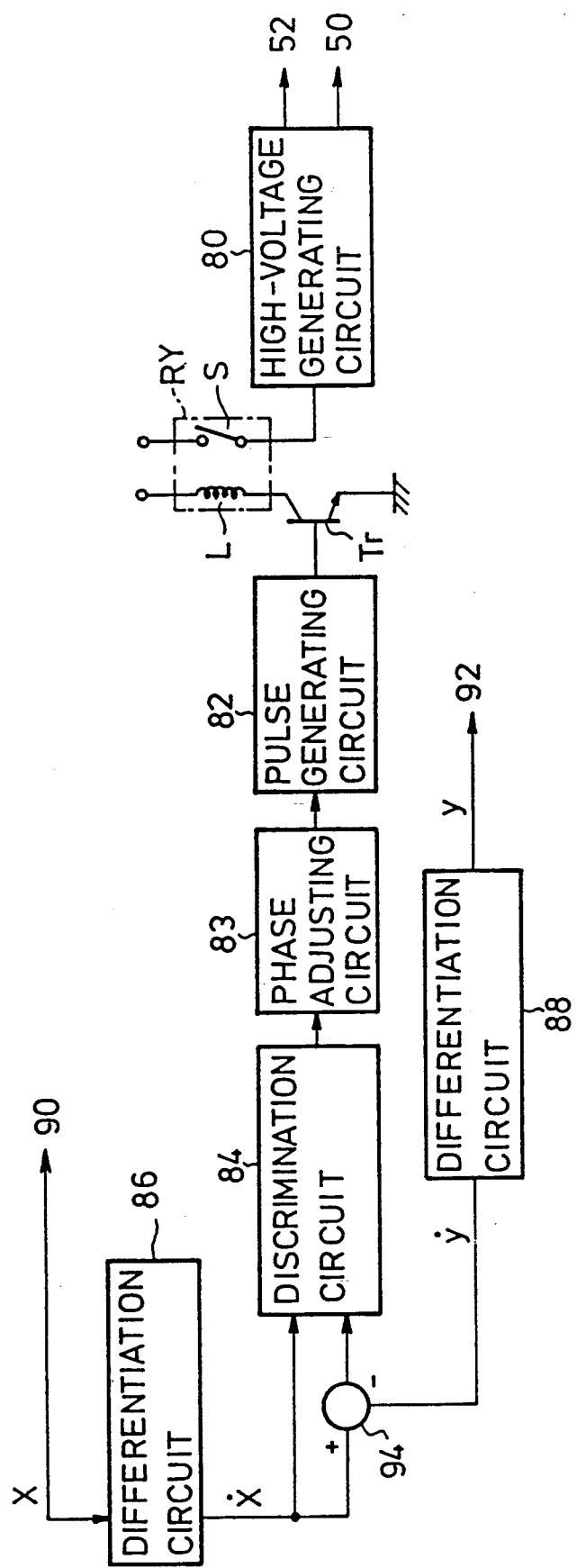

When the electric field is applied to the electrorheologic fluid, there is a certain delay for the viscosity of the fluid to change after the moment at which the electric field is applied. This delay is usually on the order of several tens of microseconds. It is therefore preferable to provide a phase control (adjusting) circuit which suitably compensates for the above-mentioned delay thereby causing the viscosity of the fluid to change at an optimum timing. The amount of advance of the phase performed by the phase control circuit can suitably be determined through experiments such that the vibration damping characteristic is optimized. Such phase advance circuits may be provided between the displacement sensor 90 and the differentiation circuit 86 and between the displacement sensor 92 and the differentiation circuit 88 or on the output sides of the differentiation circuits 86 and 88. It is also possible to provide the phase control circuit between the discriminating circuit 84 and the pulse generating circuit 82 as denoted by 83 in FIG. 1A.

In the described embodiment, the velocities of the vibration source and the vibration receiving section are detected by displacement sensors and differentiation circuits. This, however, is only illustrative and the arrangement may he such that the velocities are directly detected by velocity sensors mounted on the vibration source and the vibration receiving section. It is also possible to determine the velocities of the vibration source and the vibration receiving section by integrating outputs of acceleration sensors which are mounted on the vibration source and the vibration receiving section. In the described embodiment, whether the direction of the velocity of the vibration receiving section and the direction of the relative velocity of the vibration receiving section relative to the vibration source are the same or not is judged on the basis of the sign of the product $\dot{x}(\dot{x}-\dot{y})$. Obviously, however, the arrangement may be such that the sign of the velocity x of the vibration receiving section and the sign of the relative velocity $\dot{x}-\dot{y}$ of the vibration receiving section relative to the vibration source are detected independently and are judged whether they are the same. The judgment as to the directions also may be conducted by judging the sign of $(\dot{x}-\dot{y})/\dot{x}$ or $\dot{x}/(\dot{x}-\dot{y})$. In the described embodiment, the damping coefficient is controlled on conditions of $\dot{x}\neq 0$ and $\dot{x}\neq \dot{y}$. However, considering that the left side of the formula (1) is always zero whenever the conditions of $\dot{x}=0$ and $\dot{x}=\dot{y}$ is met, the damping coefficient c may or may not be controlled when such conditions are met. In the illustrated embodiment, the electrorheologic fluid exhibits a viscosity the level of which is increased when an electric field is applied thereto. This, however, is not exclusive and the invention can also be carried out by using an electrorheologic fluid the viscosity of which is decreased when an electric field is applied thereto. In such a case, the damping coefficient is controlled by selectively applying electric field so as to reduce the damping coefficient, i.e., by selectively suspending the application of the electric field so as to increase the damping coefficient. Although in the described embodiment the control is conducted by an analog circuit, the control of the damping coefficient in accordance with the present invention may be performed by a digital circuit which incorporates a microcomputer.

Figure 6:
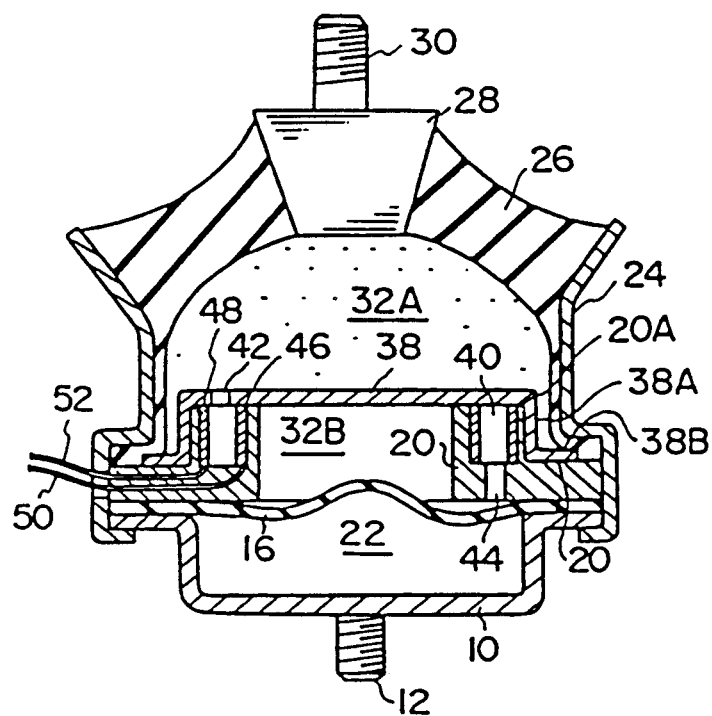
FIG. 6 is a sectional view of a second embodiment of the vibration damper to which the present invention is applicable.

FIG. 6 shows a second embodiment of the vibration damper to which the present invention can be applied. Thus, the vibration damper shown in FIG. 1 will be referred to as "the first example of the damper".

In this vibration damper, the outer peripheral portion of the partition cover 38, which is similar to that of the first example, is bent substantially at a right angle so as to form a tubular vertical wall portion 38A which contacts the outer peripheral portion of the protrusion 20A. The lower end of the vertical wall portion 38A is bent substantially at a right angle so as to provide a flange portion 38B which closely contacts the upper side of the partition wall 20 and is pressed onto the latter by a caulked lower end of the outer cylinder 24. In the second embodiment, therefore, the gap between the upper end of the partition wall 20 and the partition cover 38 is hermetically sealed thereby forming an orifice 40 which is free from leakage of the fluid.

Figure 7A:
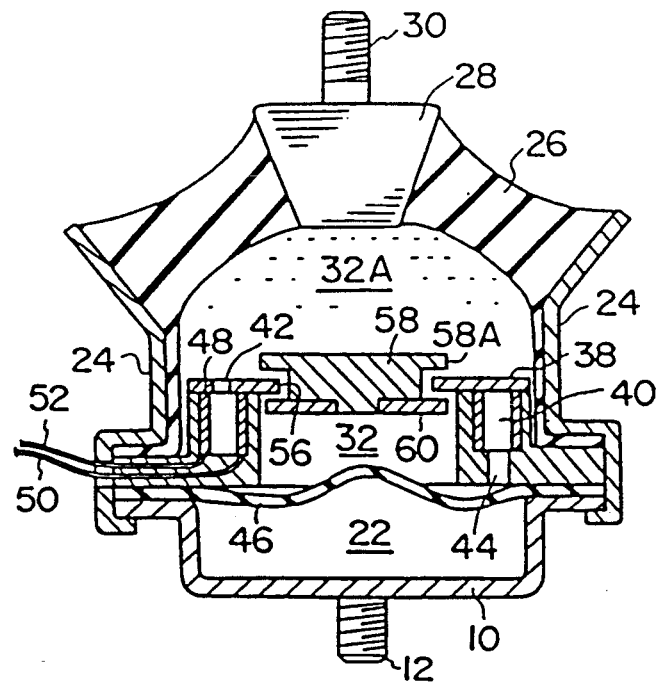
FIGS. 7A and 7B are sectional views of of third and fourth embodiments of vibration dampers to which the present invention is applicable.

FIG. 7A shows a third embodiment of the vibration damper. In this embodiment, the partition cover 38 is provided with a central opening in which is mounted a movable plate 58. The movable plate 58 has an increased-diameter end portion 58A adjacent to the upper sub-chamber 32A and is provided at its portion adjacent to the lower sub-chamber 32B with a stopper plate 60 fixed thereto. The movable plate 58 and the stopper plate 60 have diameters which are greater than that of the opening 56, while the distance between the movable plate 58 and the stopper plate 60 is greater than the thickness of the partition cover 38. Therefore, the movable plate 58 is movable in the direction of the thickness of the partition cover 38 by a small amount which is, for example, less than 0.5 mm.

This vibration damper, therefore, can absorb vibration over a wide range of frequency by making an efficient use of the change in the viscosity of the electrorheologic fluid caused by the supply of electric power to the electrode plates 46 and 48. In addition, since the movable plate 58 is allowed to vibrate, it is possible to reduce the level of noises of high frequencies without requiring the dynamic spring constant to be increased.

Figure 7B:
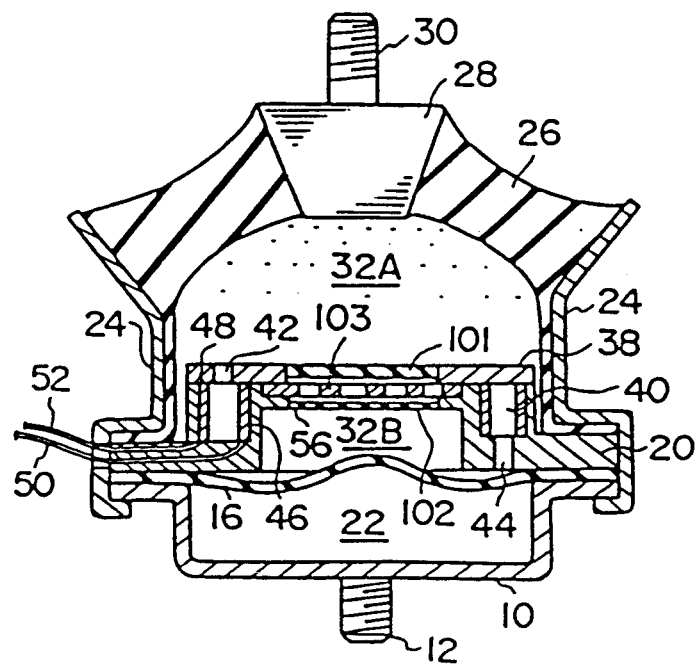

FIG. 7B shows a fourth embodiment of the vibration damper to which the invention is applied. This vibration damper employs a member which can be displaced by a small amount as is the case of the movable plate 58 incorporated in the third embodiment. The displaceable member, which is an iron plate 103, has a plurality of small holes and is disposed between a pair of elastic diaphragms 101 and 102. The partition cover 38 and the partition wall 20 are fixed by vulcanization to the elastic diaphragms 101 and 102 and these diaphragms 101 and 102 are positioned to leave a small space on each side of the iron plate 103 thereby allowing the iron plate 103 to be displaced slightly. Other portions of this fourth embodiment are materially the same as those of the embodiment shown in FIG. 7A and the advantages offered by this embodiment are materially the same as those of the embodiment shown in FIG. 7A.

Figure 8:
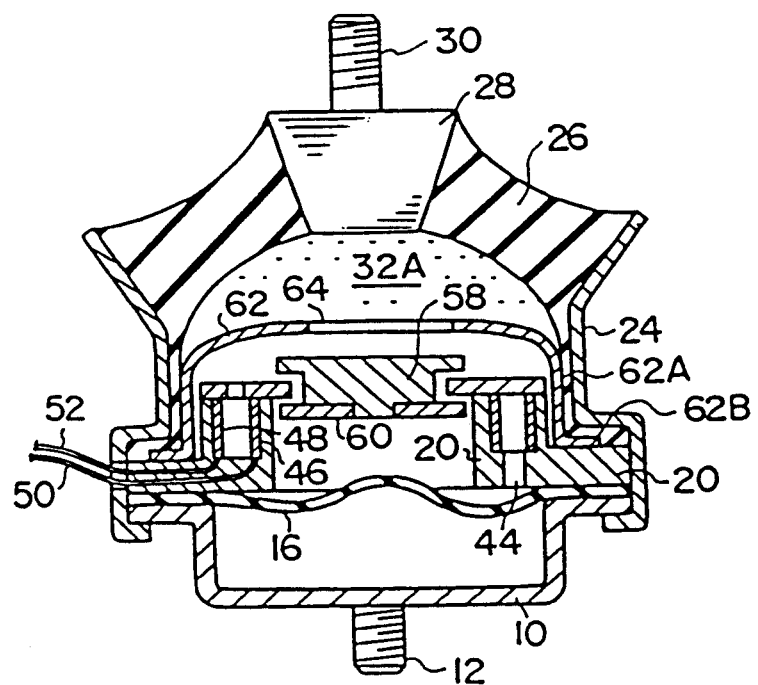
FIGS. 8 and 9 are sectional views of of fifth and sixth embodiments of vibration dampers to which the present invention is applicable.

FIG. 8 shows a fifth embodiment of the vibration damper to which the present invention is applied. This vibration damper is similar to the third embodiment but features another partition plate 62 disposed in the upper sub-chamber 32A. The partition plate 62 is disposed substantially at the center of the upper sub-chamber 32A and is turned at its peripheral portion substantially vertically so as to provide an upright wall portion 62A. The lower end of the upright wall portion 62A is bent substantially at a right angle to provide a flange 62B pressed and fixed to the partition wall 20 by the lower end of the outer cylinder 24. The partition plate 62 is provided in the center thereof with an opening 64.

The partition plate 62 divides the upper sub-chamber 32A into two sections of substantially equal sizes. These sections are communicated with each other through the opening 64.

In this embodiment of the vibration damper, therefore, it is possible to further reduce the dynamic spring constant at a specific frequency level, by making an effective use of the liquid column resonance produced around the opening 64.

Figure 9:
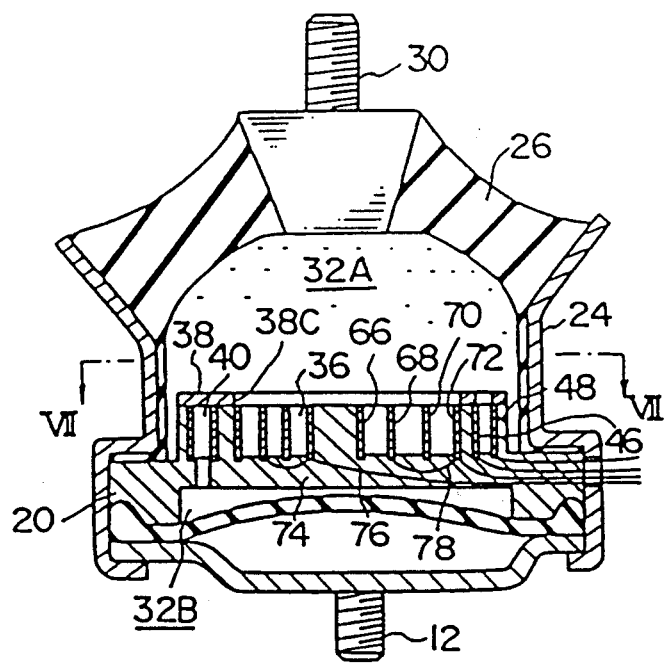
Figure 10:
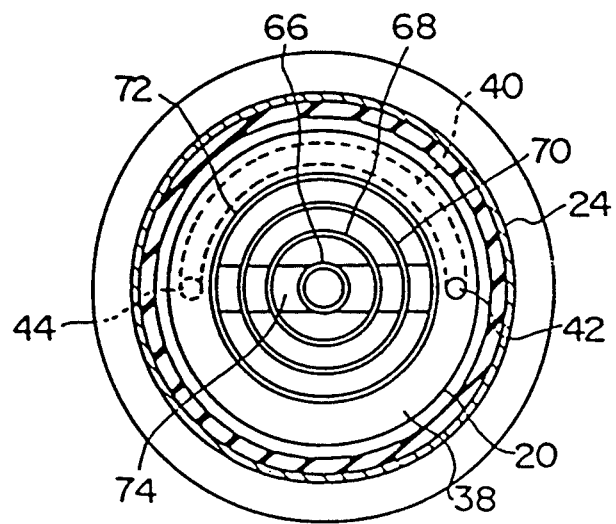
FIG. 10 is a sectional view taken along the line VII—VII of FIG. 9.

FIG. 9 shows the sixth embodiment of the vibration damper to which the present invention is applied, while FIG. 10 shows this vibration damper in cross-section.

This vibration damper is similar to the first embodiment but is discriminated from the latter by a plurality of electrode plates 66, 68, 70 and 72 which are concentrically disposed in the through hole of the first embodiment. In the illustrated case, there are four electrode plates 66, 68, 70 and 72 which are supported by arms 74 extended across the through hole 36. The electrode plates 66 and 70 are connected to one side of the high-voltage generating circuit 80 through lead lines 70 which extend through the arm 74 and the partition wall 20, while the electrode plates 68 and 72 are connected to the other side of the high-voltage generating circuit 80 through similar lead lines 78. The partition cover 38 is provided with a through hole 38C which communicates with the through hole 36. The through hole 38C cooperates with the through hole 36 in providing a communication between the upper sub-chamber 32A and the lower sub-chamber 32B.

The distance between the adjacent ones of the electrode plates 66 to 72 is substantially the same as the distance between the electrode plates 46 and 48.

In this vibration damper, the orifice which provides the communication between the upper and lower sub-chambers 32A and 32B through the through holes 36 and 38C has a cross-sectional area Sa which is larger than the cross-sectional area Sb of the orifice 40, and the length of the orifice provided by the through holes 38C and 36 is smaller than the length of the orifice 40.

In operation, the supply of the electric power to the electrode plates 46, 48 and the electrode plates 66 to 72 is controlled in various patterns so as to cause the viscosity of the fluid to be changed in the orifice 40 and in the orifice provided by the through hole 38C and 36, so that the vibration damper can damp vibrations of a variety of frequency ranges by realizing a variety of combinations of the orifice 40 and the orifice provided by the through holes 38C and 36. In order to reduce vibration at high frequencies which tends to occur during high-speed cruising of an automobile and which causes unpleasant noise of high-frequency, it is desirable that the fluid is allowed to freely flow through the orifice presented by the through hole 36 and the through hole 38C. It is possible to materially "solidify" the fluid in the through holes 38C and 36 so that the fluid communication is provided between the upper sub-chamber 32A and the lower sub-chamber 32B solely through the orifice 40. If the supply of electric power to the electrode plates 46 and 48 is suspended, the orifice 40 functions as if the electrode plates 46 and 48 are not provided.

When the bouncing vibration of the engine has a frequency of, for example, 15 Hz while the pitching vibration of the same has a frequency on the order of, for example, 7 Hz, it is impossible to attain a high damping effect at both of these frequency ranges because they are separated from each other. According to this invention, it is possible to attain a high damping effect at these frequency levels by determining the diameter and the length of the orifice 40 such that the fluid has a peak of the damping frequency at 15 Hz when no voltage is applied between the electrode plates 46 and 48, whereas, when the pitching vibration is being generated, an electric field is applied between the electrode plates 46 and 48 so as to enable the fluid to have a peak of vibration damping frequency around 7 Hz. In such a case, voltages are applied to the electrode plates 66 to 72 so as to materially solidify the fluid in the orifice in which these electrode plates are provided.

It is possible to obtain a considerably high level of spring constant by materially solidifying the fluid in the orifice 40. This feature can effectively be used for temporarily increasing the spring constant so as to prevent interference between the engine and other parts which may otherwise be caused when a heavy load level is increased drastically.

In this vibration damper, the ratio L/S between the length L and the cross-sectional area S of the orifice is preferably not smaller than 2.

Figure 11:
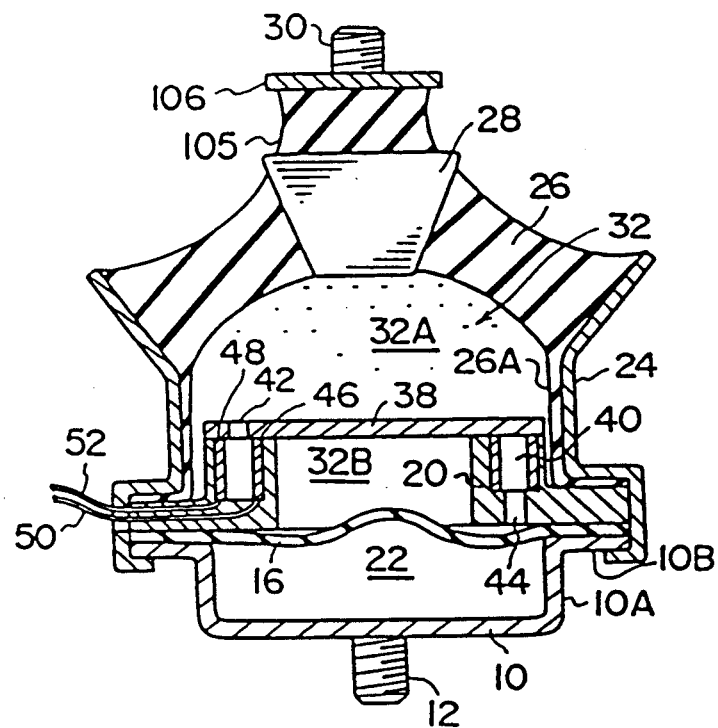
FIGS. 11 and 12 are longitudinal sectional views of seventh and eighth embodiments of vibration dampers to which the present invention is applicable.

FIG. 11 illustrates a seventh embodiment of the vibration damper. In this embodiment, the vibration damper has an elastic member 105 mounted on the support 28 and fixed by vulcanization to the plate 106 to which the bolt 30 is fixed. According to this arrangement, the fluid is prevented from flowing through the orifice 40 so that any tendency for the spring constant to increase is prevented when the pressure in the upper sub-chamber 32A is increased.

Figure 12:
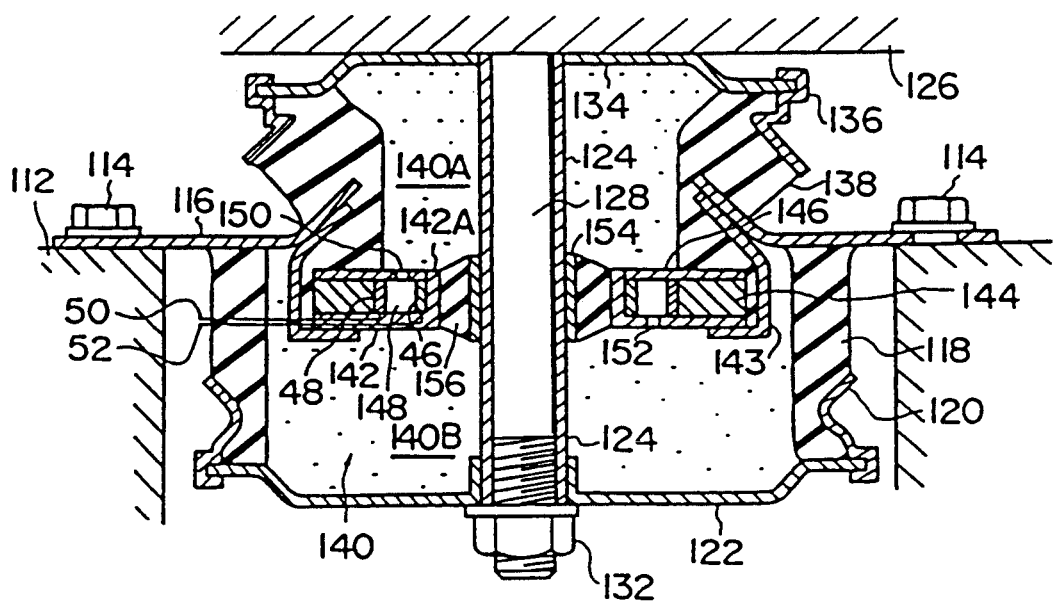

FIG. 12 shows an eighth embodiment of the vibration damper. This embodiment of the vibration damper is applied for mounting a carburetor in an automobile. The vibration damper has a base plate 116 which is fixed by a bolt 114 to the chassis 112. A lower main vibration absorber 118 is fixed at its upper end by vulcanization to the base plate 116.

A metallic short cylinder 120 is fixed by vulcanization at its inner peripheral surface to the outer peripheral portion of the lower end of the lower main vibration absorber 118. The lower end of the lower main vibration absorber 118 is supported by the base plate 122 which is fixed by caulking to the short metallic cylinder 120. The base plate 122 has an axial bore which fixedly receives the lower end of an inner cylinder 124 through which is extended a mounting bolt 128 suspended from a cabin 126 which is the vibration source. A nut 132 is screwed to the projecting end of the mounting bolt 128.

A flat plate 134 is fixed to the upper end of the inner cylinder 124. A short cylinder 136 is caulked onto the outer periphery of the flat plate 134. A cylindrical upper main vibration absorber 138, which is made of an elastic material such as a rubber, is clamped at its upper and lower ends between the short cylinder 136 and the base plate 116.

The space formed by the flat plate 134, the main vibration absorbers 118, 138 and the base plate 122 constitutes a liquid chamber 140 which is charged with an electrorheologic fluid as in the case of the liquid chambers 32 in the preceding embodiments.

The space in the liquid chamber 140 is divided into an upper sub-chamber 140A and a lower sub-chamber 140B by means of a partition wall 142 received in the liquid chamber 140. The partition wall 142 is carried by a short cylinder 143 which is fixed at its upper end to the base plate 116, and is pressed onto the short cylinder 143 by a lower end extension of the upper main vibration absorber 138.

The partition wall 142 carries a spacer 144 and a partition cover 146 fixed thereto, so that an orifice 148 is defined by the partition cover 146, a cylindrical portion 142A of the cylinder 142 and the spacer 144. The orifice 148 has the same shape as the orifices 40 in the preceding embodiments of the vibration damper. The orifice 148 communicates with the upper sub-chamber 140A and the lower sub-chamber 140B through circular holes 150 and 152 which are formed in the partition cover 146 and the partition wall 142, respectively.

The inner cylinder 124 extends through the bore formed in the cylinder portion 142A of the partition wall 142. A cylindrical rubber 156 is bonded by vulcanization between the cylindrical portion 142A and a ring 154 which is slidably secured to the outer peripheral surface of the inner cylinder 124.

In this vibration damper also, the orifice 148 accommodates electrode plates 46 and 48 which are secured to the outer peripheral surface of the cylindrical portion 142A and the inner peripheral surface of the spacer 144 so as to oppose each other. These electrode plates 46 and 48 are connected to the high-voltage generating circuit 80 so as to be supplied with electric power of a high voltage, thereby causing a change in the viscosity of the electrorheologic fluid in the orifice 148.

In the operation of the vibration damper, the vibration damping characteristics of the damper can be varied by varying the viscosity of the fluid in the orifice 148 when the cabin 126 as the vibration source vibrates.

In this vibration damper, the vibration of the cabin 126 is transmitted to the base plate 122 through the bolt 128, so that the lower sub-chamber 140B expands when the upper sub-chamber contracts, thus enabling the orifice 148 to accommodate a large quantity of electrorheologic fluid.

Figure 13:
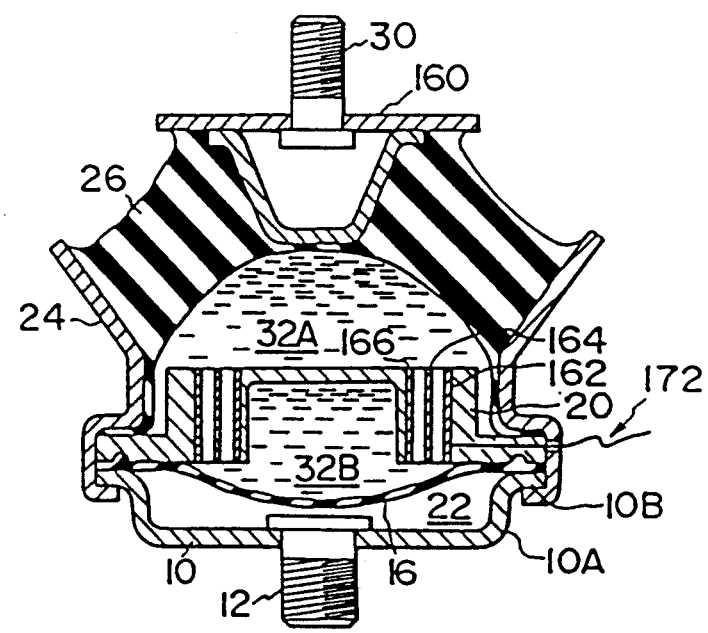
FIG. 13 is a longitudinal sectional view of a ninth embodiment of a vibration damper to which the present invention is applicable.
Figure 14:
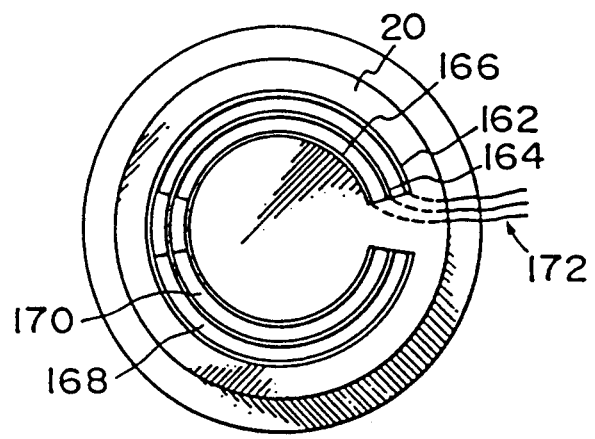
FIG. 14 is a plan view of a partition wall incorporated in the ninth embodiment of the vibration damper.

FIG. 13 illustrates a ninth embodiment of the vibration damper to which the present invention is applied. This vibration damper is substantially the same as the first to eighth embodiments described hereinbefore, so that the same reference numerals are used in FIG. 13 to denote the same parts or members as those in the first to eighth embodiments and detailed description of such parts or members is omitted. The ninth embodiment is characterized in that a substantially C-shaped orifice is used in place of the elongated orifices used in the first to eighth embodiments. More specifically, the ninth embodiment of the vibration damper has a support plate 160 fixed to the top of a main vibration absorber 26 and provided with a mounting bolt 30. A partition wall 20 made of an insulating material is disposed such as to separate upper and lower sub-chambers 32A and 32B from each other. The partition wall 20 is provided with a central thin-walled portion which is surrounded by a substantially C-shaped slot as will be seen from FIG. 14 which is a plan view of the partition wall 20. The C-shaped slot receives substantially C-shaped electrode plates 162, 164 and 166 which are arranged to form substantially C-shaped orifices 168 and 170 between the electrode plates 162 and 164 and between the electrode plates 164 and 166, respectively. The electrode plates 162, 164 and 166 are connected through the respective lead lines 172 to the high-voltage generating circuit 80. More particularly, the electrode plates 162 and 166 are commonly connected to the anode (or cathode) of the high-voltage generating circuit, while the intermediate electrode plate 164 is connected to the cathode (or anode) of the high-voltage generating circuit. In operation, the voltages between the adjacent electrodes are selectively controlled in the described manner so as to selectively change viscosity of the electrorheologic fluid in the orifice.

Although specific embodiments of the invention applied to a variety of vibration dampers have been described, it is to be understood that the described embodiments are only illustrative and various changes and modifications may be imparted thereto without departing from the scope of the invention which is limited solely by the appended claims.

What is claimed is:

1. A damping coefficient control device in a vibration damper which is placed between a vibration source and a vibration receiving section, said vibration damper having a liquid chamber having a portion made of an elastically deformable material and charged with an electrorheologic fluid having a first viscosity when no electric field is applied, a partition wall which divides said liquid chamber into a plurality of sub-chambers, an orifice providing communication between said sub-chambers, and electrodes disposed in said orifice, the damping coefficient control device being constituted to control the voltage applied to said electrodes by only an on operation and an off operation, a predetermined substantially uniform voltage being applied to said electrodes when said control device is in said on operation, no voltage being applied to said electrodes when said control device is in said off operation, to vary the viscosity of said electrorheologic fluid, thereby controlling the damping coefficient of said vibration damper, said damping coefficient control device comprising:

first velocity detecting means for detecting a first velocity which is the velocity of said vibration receiving section;

second velocity detecting means for detecting a second velocity which is the velocity of said vibration source;

discrimination means for discriminating whether the direction of said first velocity is the same as the direction of the relative velocity of said vibration receiving section relative to said vibration source;

control means for controlling said voltage such that said predetermined voltage is applied, to increase the damping coefficient of said fluid when the direction of said first velocity is the same as that of said relative velocity and such that no voltage is applied, so that the damping coefficient of said fluid is equal to said first viscosity when the direction of said first velocity is different from that of said relative velocity; and phase adjusting means for advancing the phase of control to compensate for any delay in change of the viscosity of said electrorheologic fluid after application of said voltages to said electrodes, thereby ensuring that the change in said viscosity of said electrorheologic fluid is completed in a proper timing.

2. A damping coefficient control device according to claim 1, wherein said first velocity detecting means includes a first displacement sensor capable of sensing the displacement of said vibration receiving section, and first differentiation means for differentiating the output of said first displacement sensor so as to output the velocity of said vibration receiving section, while said second velocity detecting means includes a second displacement sensor capable of sensing the displacement of said vibration source, and second differentiation means for differentiating the output of said second displacement sensor so as to output the velocity of said vibration source.

3. A damping coefficient control device according to claim 2, wherein said discrimination means includes an adder for receiving the outputs from said first and second differentiation means so as to compute the relative velocity of said vibration receiving section relative to said vibration source, and a discrimination circuit adapted for receiving the output from said first differentiation means and the output from said adder, thereby judging whether the direction of said velocity of said vibration receiving section and the direction of said relative velocity are the same.

4. A damping coefficient control device according to claim 3, wherein said discrimination circuit is constituted to judge whether said directions are the same or different by judging whether the product of the output of said first differentiation means and the output of said adder is positive or negative.

5. A damping coefficient control device according to claim 3, wherein said control means includes a high-voltage generating circuit operative in response to the output of said discrimination circuit such as to apply a high voltage to said electrodes when said output of said discrimination circuit indicates that said directions are the same but not to apply said voltage to said electrodes when said output of said discrimination circuit indicates that said directions are different.

6. A damping coefficient control device according to claim 5, wherein said control means further includes a pulse generating circuit for receiving the output from said discrimination circuit and delivering a pulse signal corresponding to the output of said discrimination circuit to said high-voltage generating circuit thereby activating said high-voltage generating circuit.

7. A damping coefficient control device according to claim 1, wherein said vibration receiving section has a frequency of bouncing vibration and a frequency of pitching vibration, said electrorheologic fluid has a peak vibration damping frequency at approximately said frequency of bouncing vibration of the vibration receiving section when said control device is in said off operation, and wherein said electrorheologic fluid has a peak vibration damping frequency approximately equal to said frequency of pitching vibration of the vibration receiving section when said control device is in said on operation.

8. A damping coefficient control device in a vibration damper which is placed between a vibration source and a vibration receiving section which is to be isolated from the vibration of the vibration source, said damper having a main body, a portion of which is made from an elastic member, a liquid chamber expandable and contractible in response to the elastic deformation of said elastic member and charged with an electrorheologic fluid having a first viscosity when no electric field is applied, and which changes its viscosity under the influence of a voltage, a partition wall which divides said liquid chamber into a plurality of sub-chambers, an orifice providing communication between said sub-chambers, and electrodes disposed in said orifice so as to apply a voltage to said electrorheologic fluid, said damping coefficient control device being constituted to control the voltage applied to said electrodes by only an on operation and an off operation, a predetermined substantially uniform voltage being applied to said electrodes when said control device is in said on operation, no voltage being applied to said electrodes when said control device is in said off operation so as to vary the viscosity of said electrorheologic fluid, thereby controlling the damping coefficient of said vibration damper, said damping coefficient control device comprising:
  vibration receiving section velocity detecting means for detecting a first velocity which is the velocity of said vibration receiving section;
  vibration source velocity detecting means for detecting a second velocity which is the velocity of said vibration source;
  relative velocity detecting means for detecting the relative velocity of said vibration receiving section relative to said vibration source;
  discrimination means for discriminating whether the direction of said first velocity is the same as the direction of the relative velocity of said vibration receiving section relative to said vibration source;
  control means for controlling said voltage such that said predetermined voltage is applied, to increase the damping coefficient of said fluid when the direction of said first velocity is the same as that of said relative velocity and such that no voltage is applied, so that the damping coefficient of said fluid is equal to said first viscosity when the direction of said first velocity is different from that of said relative velocity; and
  phase adjusting means for advancing the phase of control to compensate for any delay in change of the viscosity of said electrorheologic fluid after application of said voltage to said electrodes, thereby ensuring that the change in said viscosity of said electrorheologic fluid is completed in a proper timing.

9. A damping coefficient control device according to claim 8, wherein said vibration receiving section velocity detecting means includes a first displacement sensor capable of sensing the displacement of said vibration receiving section, and first differentiation means for differentiating the output of said first displacement sensor so as to output the velocity of said vibration receiving section, while said vibration source velocity detecting means includes a second displacement sensor capable of sensing the displacement of said vibration source, and second differentiation means for differentiating the output of said second displacement sensor so as to output the velocity of said vibration source.

10. A damping coefficient control device according to claim 9, wherein said discrimination means includes an adder for receiving the outputs from said first and second differentiation means so as to compute the relative velocity of said relative to said vibration source.

11. A damping coefficient control device according to claim 10, wherein said discrimination circuit is constituted to judge whether said directions are the same or different by judging whether the product of the output of said first differentiation means and the output of said adder is positive or negative.

12. A damping coefficient control device according to claim 11, wherein said control means includes a high-voltage generating circuit operative in response to the output of said discrimination circuit such as to apply a high voltage to said electrodes when said output of said discrimination circuit indicates that said directions are the same but not to apply said voltage to said electrodes when said output of said discrimination circuit indicates that said directions are different.

13. A damping coefficient control device according to claim 12, wherein said control means further includes a pulse generating circuit for receiving the output from said discrimination circuit and delivering a pulse signal corresponding to the output of said discrimination circuit to said high-voltage generating circuit thereby activating said high-voltage generating circuit.

14. A damping coefficient control device according to claim 8, wherein said vibration receiving section has a frequency of bouncing vibration and a frequency of pitching vibration, said electrorheologic fluid has a peak vibration damping frequency at approximately said frequency of bouncing vibration of the vibration receiving section when said control device is in said off operation, and wherein said electrorheologic fluid has a peak vibration damping frequency approximately equal to said frequency of pitching vibration of the vibration receiving section when said control device is in said on operation.

* * * * *